(12) United States Patent
Xiao et al.

(10) Patent No.: US 8,861,113 B2
(45) Date of Patent: Oct. 14, 2014

(54) NOISE PREDICTIVE FILTER ADAPTATION FOR INTER-TRACK INTERFERENCE CANCELLATION

(71) Applicant: LSI Corporation, San Jose, CA (US)

(72) Inventors: Jun Xiao, Fremont, CA (US); Jongseung Park, Allentown, PA (US); Fan Zhang, Milpitas, CA (US); Ivana Djurdjevic, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/777,915

(22) Filed: Feb. 26, 2013

(65) Prior Publication Data

US 2014/0233129 A1    Aug. 21, 2014

Related U.S. Application Data

(60) Provisional application No. 61/765,682, filed on Feb. 15, 2013.

(51) Int. Cl.
*G11B 5/09* (2006.01)
*G11B 5/035* (2006.01)
*G11B 20/24* (2006.01)

(52) U.S. Cl.
CPC .................................... *G11B 20/24* (2013.01)
USPC ............................................. 360/45; 360/65

(58) Field of Classification Search
CPC .................... G11B 20/10009; G11B 20/10046
See application file for complete search history.

(56) References Cited

U.S. PATENT DOCUMENTS

| | | | |
|---|---|---|---|
| 6,535,553 B1 | 3/2003 | Limberg et al. | |
| 7,248,630 B2 | 7/2007 | Modrie | |
| 7,257,764 B2 | 8/2007 | Suzuki | |
| 7,421,017 B2 | 9/2008 | Takatsu | |
| 7,502,189 B2 | 3/2009 | Sawaguchi | |
| 7,715,471 B2 | 5/2010 | Werner | |
| 7,729,071 B2 * | 6/2010 | Harada | 360/39 |
| 8,018,360 B2 | 9/2011 | Nayak | |
| 8,046,666 B2 | 10/2011 | Park et al. | |
| 8,208,213 B2 | 6/2012 | Liu | |
| 8,250,434 B2 | 8/2012 | Yang | |
| 2006/0123285 A1 | 6/2006 | De Araujo | |
| 2009/0002862 A1 | 1/2009 | Park et al. | |
| 2010/0067621 A1 | 3/2010 | Noelder | |
| 2011/0072335 A1 | 3/2011 | Liu et al. | |
| 2011/0075569 A1 | 3/2011 | Marrow | |
| 2011/0164332 A1 | 7/2011 | Cao | |
| 2011/0167227 A1 | 7/2011 | Yang et al. | |
| 2011/0242692 A1 * | 10/2011 | Blinick et al. | 360/31 |
| 2012/0019946 A1 | 1/2012 | Aravind | |
| 2012/0056612 A1 | 3/2012 | Mathew | |
| 2012/0063022 A1 | 3/2012 | Mathew | |
| 2012/0063024 A1 | 3/2012 | Mathew | |

(Continued)

OTHER PUBLICATIONS

Gibson et al "Directions for Shingled-Write and Two-Dimensional Magnetic Recording System Architectures: Synergies with Solid-State Disks" Carnegie Mellon Univ. May 1, 2009.

(Continued)

*Primary Examiner* — Daniell L Negron
(74) *Attorney, Agent, or Firm* — Hamilton DeSanctis & Cha (57) ABSTRACT

Systems, methods, devices, circuits for data processing, and more particularly to systems and methods for adapting noise predictive filters for inter-track interference cancellation in a data processing system.

20 Claims, 6 Drawing Sheets

(56) References Cited

U.S. PATENT DOCUMENTS

| | | |
|---|---|---|
| 2012/0063284 A1 | 3/2012 | Mathew |
| 2012/0069891 A1 | 3/2012 | Zhang |
| 2012/0124119 A1 | 5/2012 | Yang |
| 2012/0236430 A1 | 9/2012 | Tan |
| 2013/0054664 A1 | 2/2013 | Chang |
| 2014/0063637 A1* | 3/2014 | Pan et al. ................. 360/65 |

OTHER PUBLICATIONS

U.S. Appl. No. 13/597,046, filed Aug. 28, 2012, Lu Pan, Unpublished.

U.S. Appl. No. 13/562,140, filed Jul. 30, 2012, Haotian Zhang, Unpublished.

U.S. Appl. No. 13/742,336, filed Jan. 15, 2013, Jianzhong Huang, Unpublished.

U.S. Appl. No. 13/551,507, filed Jul. 17, 2012, Ming Jin, Unpublished.

U.S. Appl. No. 13/545,784, filed Jul. 10, 2012, Yu Liao, Unpublished.

U.S. Appl. No. 13/525,188, filed Jun. 15, 2012, Yang Han, Unpublished.

U.S. Appl. No. 13/525,182, filed Jun. 15, 2012, Yang Han, Unpublished.

U.S. Appl. No. 13/346,556, filed Jan. 9, 2012, Haitao Xia, Unpublished.

U.S. Appl. No. 13/272,209, filed Oct. 12, 2011, Yu Liao, Unpublished.

U.S. Appl. No. 13/239,719, filed Sep. 22, 2011, Haitao Xia, Unpublished.

U.S. Appl. No. 13/491,062, filed Jun. 7, 2012, Jin Lu, Unpublished.

Wu, et al., "Equation Based LDPC Decoder for Intersymbol Interference Channels" 2005 IEEE International Conf. on Acoustics, Speech, and Signal Processing vol. 5 Mar. 2005.

* cited by examiner

NOISE PREDICTIVE FILTER ADAPTATION FOR INTER-TRACK INTERFERENCE CANCELLATION

CROSS REFERENCE TO RELATED APPLICATIONS

The present application claims priority to (is a non-provisional of) U.S. Pat. App. No. 61/765,682, entitled "Noise Predictive Filter Adaptation For Inter-Track Interference Cancellation", and filed Feb. 15, 2013 by Xiao et al, the entirety of which is incorporated herein by reference for all purposes.

FIELD OF THE INVENTION

Various embodiments of the present invention provide systems and methods for data processing, and more particularly to systems and methods for adapting noise predictive filters for inter-track interference cancellation in a data processing system.

BACKGROUND

Figure 1A:
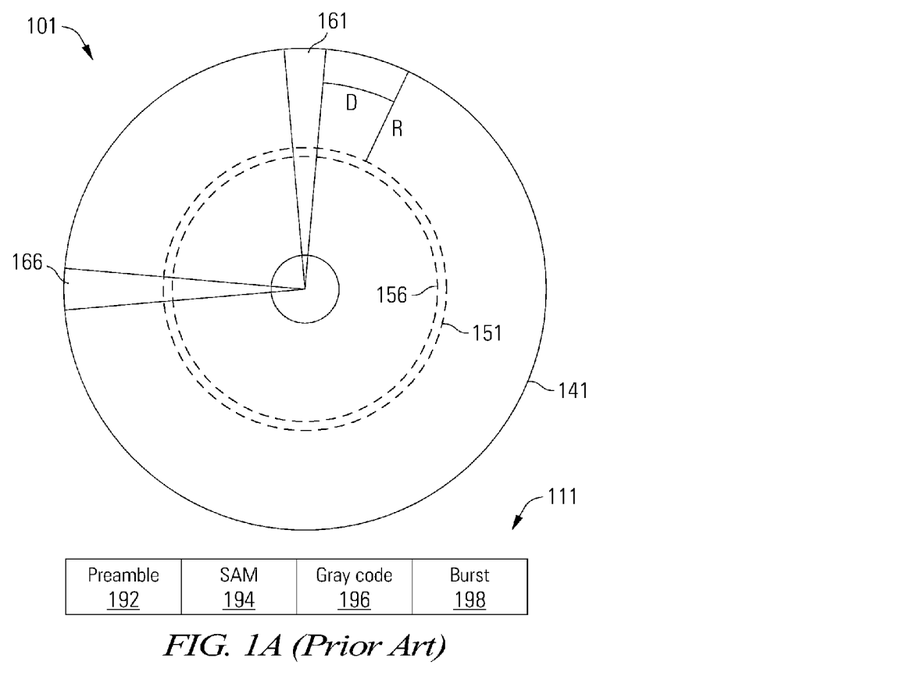
FIG. 1a depicts an existing storage medium including servo data.
Figure 1B:
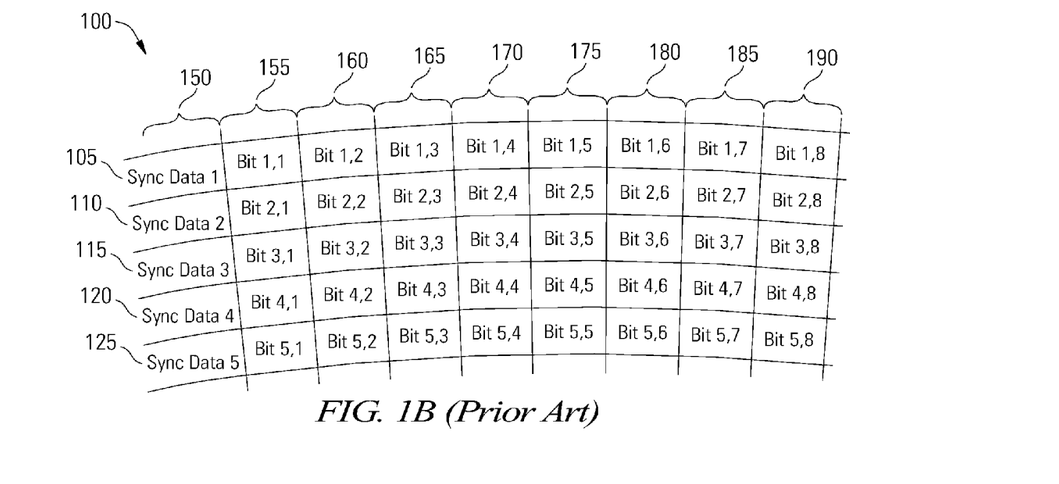
FIG. 1b depicts an existing track to track layout of data on a storage medium.

Data storage systems often store data arranged in tracks. FIG. 1a shows a storage medium 101 with two exemplary tracks 151, 156 indicated as dashed lines. The tracks are segregated by servo data written within wedges 161, 166 (i.e., servo wedges). These wedges include data and supporting bit patterns 111 that are used for control and synchronization of the read/write head assembly over a desired location on storage medium 101. In particular, these wedges generally include a preamble pattern 192 followed by a sector address mark 194 (SAM). Sector address mark 194 is followed by a Gray code 196, and Gray code 196 is followed by burst information 198. It should be noted that while two tracks and two wedges are shown, hundreds of each would typically be included on a given storage medium. User data is stored at bit period locations between successive servo wedges. FIG. 1b shows an existing track to track layout 100 of data on a storage medium. Of note, track to track layout 100 includes only some of the data across some of the tracks that would be expected on an existing storage medium. As shown, layout 100 includes a number of tracks 105, 110, 115, 120, 125. Each of the tracks includes a synchronization pattern 150 (i.e., sync data 1, sync data 2, sync data 3, sync data 4, sync data 5) followed by bit periods of user data 155, 160, 165, 170, 175, 180, 185, 190. The bit periods each include magnetic information corresponding to data for a given bit period. As the density of the bit periods increase, magnetic information from one bit period will interfere or be combined with magnetic information from surrounding bit periods. This includes interaction from bit periods in one track with bit periods in prior and subsequent tracks. Failure to properly account for inter-track interference results in diminished accuracy of read back data.

SUMMARY

Various embodiments of the present invention provide systems and methods for data processing, and more particularly to systems and methods for adapting noise predictive filters for inter-track interference cancellation in a data processing system.

A data processing system is disclosed including a first noise predictive filter circuit operable to filter digital data, a first data detector circuit operable to apply a data detection algorithm to an output of the first noise predictive filter circuit to yield a detected output, an inter-track interference cancellation circuit operable to reduce inter-track interference in the digital data based in part on the first detected output to yield cleaned data, a second noise predictive filter circuit operable to filter the cleaned data, and an adaptation circuit operable to generate filter coefficients for the second noise predictive filter circuit based in part on the cleaned data and on a signal derived from an output of the second noise predictive filter circuit.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

In a storage system where bit period density has increased to the point that interference from one bit period location to another bit period location occurs, inter-track interference between bit periods in surrounding tracks may be estimated by correlating a read back signal from track being processed with hard data bits (i.e., non-return to zero (NRZ) data bits) from an adjacent or side track. These bits are referred to herein as side track NRZ data.

Various embodiments of the present invention utilize a combination of a data detector circuit and a data decoder circuit to process data sets. In particular, a data set is processed through a data detector circuit to yield a detected output, and the detected output is processed through the data decoder circuit to yield a decoded output. Where the data decoder circuit converges (i.e., yields the original data set as indicated by, for example, resolution of all check equations built into the data set) or a timeout condition is met, the data is provided as a hard decision output. A loop detector circuit is also provided to determine timing feedback and other operations designed to align the sampling of analog to digital converter circuit with a received data set, and/or to adjust a gain applied by an analog front end circuit. Inter-track interference cancellation is performed for the signal passed to the data detector circuit and data decoder circuit, in order to reduce errors. However, inter-track interference cancellation is generally not performed for the signal passed to the loop detector circuit, because the latency introduced by inter-track interference cancellation would degrade the functions performed by the loop detector circuit.

Noise predictive filtering is performed on signals before processing in the loop detector circuit and in the data detector circuit. The filter coefficients for noise predictive filters are calculated or adapted at least in part based on data samples in which inter-track interference has been cancelled, improving the detection achieved by the data detector circuit. In some embodiments, filter coefficients for noise predictive filters supplying both the loop detector circuit and the data detector circuit are adapted based on data samples in which inter-track interference has been cancelled, thereby favoring the noise predictive filter (or backend filter) supplying the data detector circuit. In some other embodiments, the filter coefficients for the noise predictive filter (or frontend filter) that supplies the loop detector circuit are adapted based on data samples in which inter-track interference has not been cancelled, matching the samples provided to the loop detector circuit.

Figure 2:
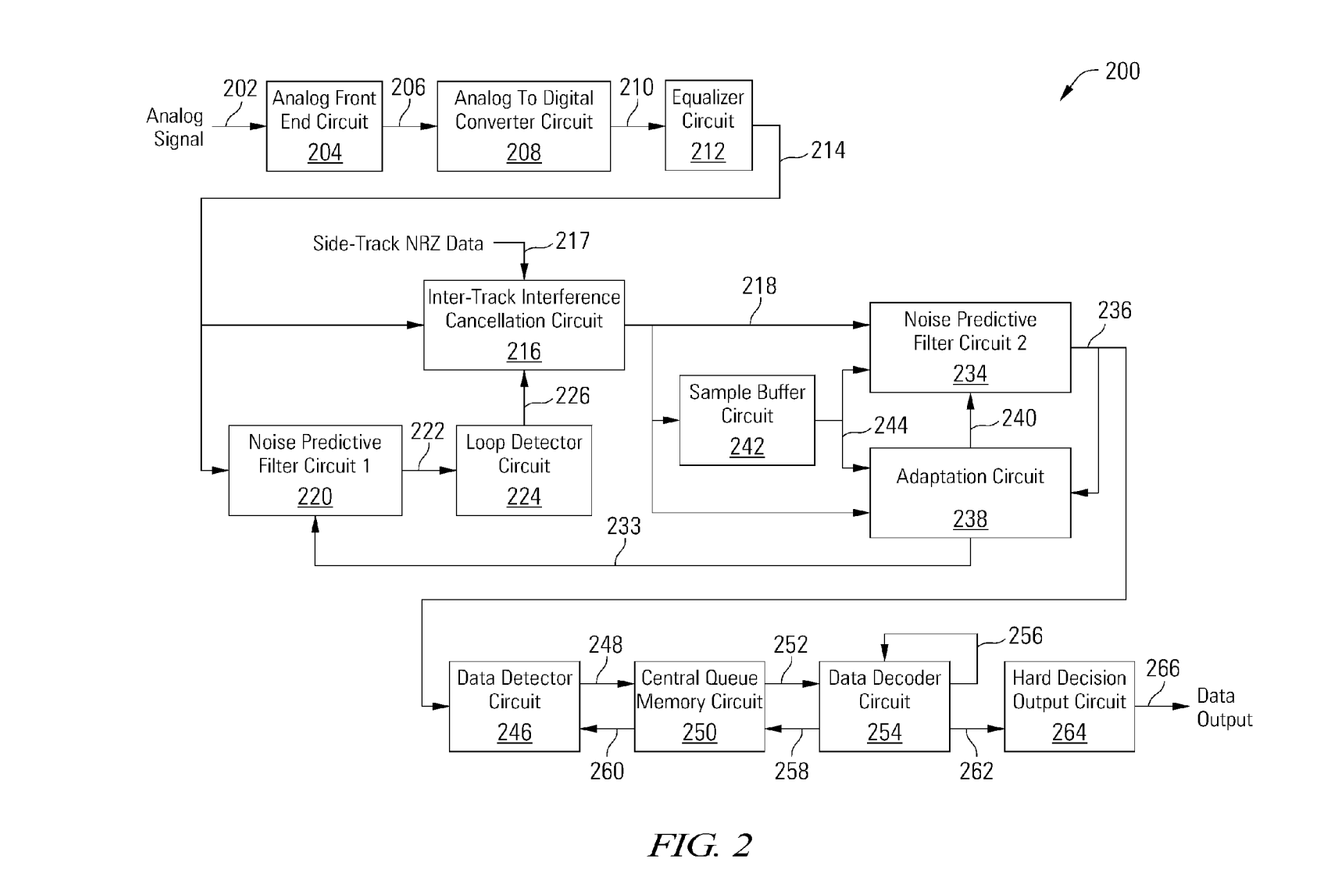
FIG. 2 depicts a data processing system with noise predictive filter adaptation using data samples with inter-track interference cancellation in accordance with some embodiments of the present invention.

FIG. 2 depicts a data processing system 200 that employs noise predictive filter adaptation for inter-track interference cancellation in accordance with some embodiments of the present invention. Data processing system 200 includes an analog front end circuit 204 that receives an analog signal 202. Analog front end circuit 202 processes analog signal 202 and provides a processed analog signal 206 to an analog to digital converter circuit 208. Analog front end circuit 208 may include, but is not limited to, an analog filter and an amplifier circuit as are known in the art. Based upon the disclosure provided herein, one of ordinary skill in the art will recognize a variety of circuitry that may be included as part of analog front end circuit 204. In some embodiments, analog input signal 202 is derived from a read/write head assembly (not shown) that is disposed in relation to a magnetic storage medium (not shown).

Analog to digital converter circuit 208 converts processed analog signal 206 into a corresponding series of digital samples 210. Digital samples 210 (and signals derived therefrom) prior to being processed by an equalizer circuit 212 are considered X samples. Analog to digital converter circuit 208 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 210 are provided to an equalizer circuit 212. Equalizer circuit 212 applies an equalization algorithm to digital samples 210 to yield an equalized output 214. In some embodiments of the present invention, equalizer circuit 212 is a digital finite impulse response filter circuit as are known in the art. Equalized output 214 (and signals derived therefrom) after being processed by equalizer circuit 212 contains digital samples which are considered Y samples.

Equalized output 214 is provided to a front end noise predictive filter circuit 220 to perform noise predictive filtering, yielding loop Y samples 222. The noise predictive filter circuit 220 may be, but is not limited to, a noise predictive finite impulse response filter bank, a bank of parallel digital finite impulse response filters applying different filter coefficients or tap coefficients. Any noise predictive filter known in the art may be used. One example of a noise predictive filter is discussed in Kavcic et al., "A Signal-dependent Autoregressive Channel Model", IEEE Transactions on Magnetics, Vol. 35, September 1999, pp. 2316-2318. The entirety of the aforementioned reference is incorporated herein by reference for all purposes.

The loop Y samples 222 from noise predictive filter circuit 220 are provided to a loop detector circuit 224. The loop detector circuit 224 is a circuit that is capable of producing a detected output 226 by applying a data detection algorithm to the loop Y samples 222 to return a representation of the data from which analog signal 202 was derived. The data detection algorithm applied by the loop detector circuit 224 may be, but is not limited to, a soft output Viterbi algorithm (SOVA), or a maximum a posteriori detection algorithm as are known in the art. Based upon the disclosure provided herein, one of ordinary skill in the art will recognize a variety of data detection algorithms that may be used in relation to different embodiments of the present invention. In some embodiments, loop detector circuit 224 is operable to determine timing feedback and other operations designed to align the sampling of analog to digital converter circuit 208 with the received data set, and/or to adjust a gain applied by analog front end circuit 204.

An inter-track interference cancellation circuit 216 calculates inter-track interference in the equalized output 214 and subtracts the calculated inter-track interference from the equalized output 214 to yield cleaned data samples 218, based on the detected output 226 from loop detector circuit 224 and on side-track NRZ data 217. In some embodiments, the side-track NRZ data 217 contains NRZ data from only one side of the track currently being processed, that is, the previously read track. In some other embodiments, the side-track NRZ data 217 contains NRZ data from tracks on either side of the track currently being processed. Again, inter-track interference cancellation is not applied in some embodiments before loop detector circuit 224, enabling the latency of detected output 226 to be kept at a low level for feedback to the analog front end circuit 204 and analog to digital converter circuit 208. The inter-track interference may be calculated and subtracted consistent with the disclosure of U.S. patent application Ser. No. 13/618,317 entitled "Systems and Methods for Hard Decision Based ITI Cancellation", and filed by Xiao et al. on Sep. 14, 2012. The entirety of the aforementioned reference is incorporated herein by reference for all purposes. In some embodiments, the inter-track interference calculation may be done in accordance with the equations below:

$$\text{Interference} = g^-[k] * a^-[n-k]$$

where $g^-[k]$ is the inter-track interference response and $a^-[n-k]$ is side track NRZ data 217 (i.e., hard decision data from a track adjacent to the track currently being processed). In some cases, n is five thousand (5000) samples, however, one of ordinary skill in the art will recognize other numbers of samples that may be used in relation to different embodiments of the present invention. The inter-track interference algorithm is generally driven by side track NRZ data $a^-[n]$ 217 and current track estimated NRZ data a [n], which is provided by loop detector circuit 224 as detected output 226.

$$g^-[k] = \text{Average over } n \text{ samples of } \{e[n] \cdot a^-[n-k]\}, \text{ and}$$

$$e[n] = y[n] - \Sigma g[k]\hat{a}[n-k]$$

In the aforementioned equations, g [k] is an inter-track interference response coefficient that may be pre-calculated, â[n–k] is a feedback input or detected output 226 from loop detector circuit 224, and y[n] is equalized output 214.

The calculated interference is then subtracted from equalized output 214 by inter-track inter-track interference cancellation circuit 216 to yield cleaned data samples 218 in accordance with the following equation:

$$\text{Cleaned data samples 218} = \text{equalized output 214} - \text{interference}[n]$$

where n indicates the particular bit or symbol.

Cleaned data samples 218 are then written to sample buffer circuit 242 where it can then be provided as buffered data 244 for subsequent iterations through backend data detector circuit 246 and data decoder circuit 254. Sample buffer circuit 242 includes sufficient memory to maintain one or more codewords until processing of that codeword is completed through data detector circuit 246 and data decoder circuit 254 including, where warranted, multiple "global iterations" defined as passes through both data detector circuit 246 and data decoder circuit 254 and/or "local iterations" defined as passes through data decoding circuit 254 during a given global iteration.

Cleaned data samples 218 are also provided in some embodiments directly to a backend noise predictive filter circuit 234 to perform noise predictive filtering, yielding Y samples 236. The noise predictive filter circuit 234 may be, but is not limited to, a noise predictive finite impulse response filter bank, a bank of parallel digital finite impulse response filters applying different filter coefficients or tap coefficients. Any noise predictive filter known in the art may be used. The noise predictive filtering in noise predictive filter circuit 234 may be performed either on cleaned data samples 218 direct from inter-track interference cancellation circuit 216 or on buffered data 244 from sample buffer circuit 242.

An adaptation circuit 238 generates filter coefficients 240 and 233 for the backend noise predictive filter circuit 234 and for the frontend noise predictive filter circuit 220 based on the cleaned data samples 218 (or buffered data 244) and on the Y samples 236. In some embodiments, the adaptation circuit 238 is a least mean squares error calculation circuit operable to generate filter coefficients that reduce an error signal based on the cleaned data samples 218 (or buffered data 244) and on the Y samples 236. Based upon the disclosure provided herein, one of ordinary skill in the art will recognize a variety of error signal generation circuits that may be included as part of adaptation circuit 238 to generate filter coefficients 240 and 233. In this embodiment, filter coefficients 240 the backend noise predictive filter 234 supplying the data detector circuit 246 and filter coefficients 233 for the loop noise predictive filter circuit 220 supplying the loop detector circuit 224 are both adapted based on data samples 218 or 244 in which inter-track interference has been cancelled, thereby favoring the backend noise predictive filter 234 supplying the data detector circuit 246.

The Y samples 236 from noise predictive filter circuit 234 are provided to data detector circuit 246 which yields detected output 248. Data detector circuit 246 is a data detector circuit capable of producing detected output 248 by applying a data detection algorithm. In some embodiments, the data detection algorithm may be but is not limited to, a soft output Viterbi algorithm (SOVA), or a maximum a posteriori detection algorithm as are known in the art. Based upon the disclosure provided herein, one of ordinary skill in the art will recognize a variety of data detection algorithms that may be used in relation to different embodiments of the present invention. Loop detector circuit 224 and data detector circuit 246 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 248 is provided to a central queue memory circuit 250 that operates to buffer data passed between data detector circuit 248 and data decoder circuit 254. When data decoder circuit 254 is available, data decoder circuit 254 receives detected output 248 from central queue memory 250 as a decoder input 252. Data decoder circuit 254 applies a data decoding algorithm to decoder input 252 in an attempt to recover originally written data. The result of the data decoding algorithm is provided as a decoded output 258. Similar to detected output 248, decoded output 258 may include both hard decisions and soft decisions. Data decoder circuit 254 may be any data decoder circuit known in the art that is capable of applying a decoding algorithm to a received input. Data decoder circuit 254 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 254 provides the result of the data decoding algorithm as a data output 262. Data output 262 is provided to a hard decision output circuit 264 where the data is reordered before providing a series of ordered data sets as a data output 266.

One or more iterations through the combination of data detector circuit 246 and data decoder circuit 254 may be made in an effort to converge on the originally written data set. As mentioned above, processing through both the data detector circuit and the data decoder circuit is referred to as a "global iteration". For the first global iteration, data detector circuit 246 applies the data detection algorithm without guidance from a decoded output. For subsequent global iterations, data detector circuit 246 applies the data detection algorithm to Y samples 236 as guided by decoded output 258. Decoded output 258 is received from central queue memory 250 as a detector input 260.

During each global iteration it is possible for data decoder circuit 254 to make one or more local iterations including application of the data decoding algorithm to decoder input 252. For the first local iteration, data decoder circuit 254 applies the data decoder algorithm without guidance from a decoded output 256. For subsequent local iterations, data decoder circuit 254 applies the data decoding algorithm to decoder input 252 as guided by a previous decoded output 256. In some embodiments of the present invention, a default of ten local iterations is allowed for each global iteration.

In some embodiments, the inter-track interference cancellation circuit 216, noise predictive filter circuit 220 and loop detector circuit 224 are part of a loop processing circuit, and the noise predictive filter circuit 234, adaptation circuit 238, data detector circuit 246, and data decoder circuit 254 are part of a backend processing circuit.

Figure 3:
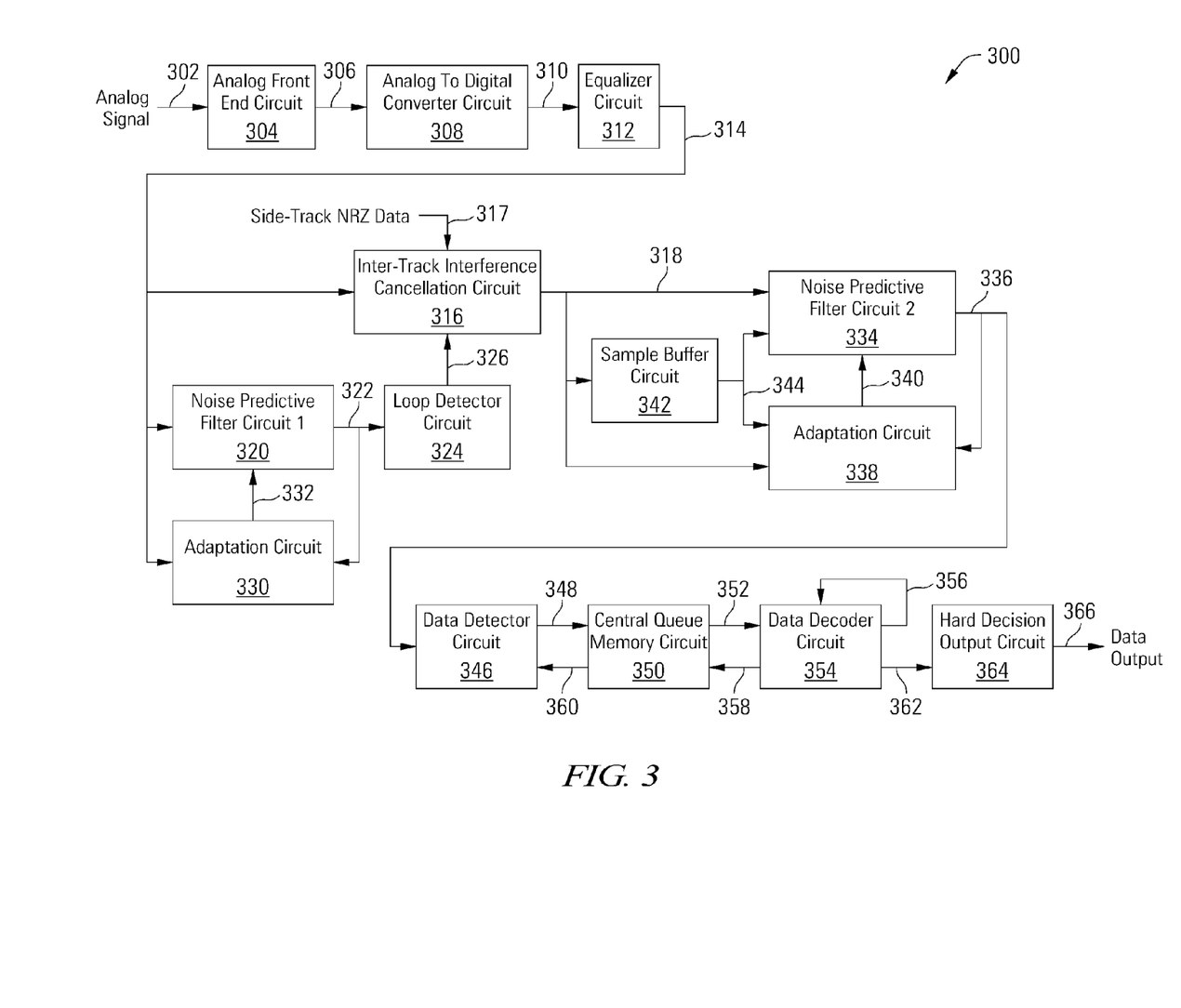
FIG. 3 depicts a data processing system with noise predictive filter adaptation using data samples both with and without inter-track interference cancellation in accordance with some embodiments of the present invention.

Turning to FIG. 3, in some other embodiments of a data processing system 300 that employs noise predictive filter adaptation for inter-track interference cancellation, the filter coefficients 332 for the noise predictive filter 320 (the loop or frontend filter) that supplies the loop detector circuit 324 are adapted based on data samples 314 in which inter-track interference has not been cancelled, matching the samples provided to the loop detector circuit 324. Data processing system 300 includes an analog front end circuit 304 that receives an analog signal 302. Analog front end circuit 302 processes analog signal 302 and provides a processed analog signal 306 to an analog to digital converter circuit 308. Analog front end circuit 308 may include, but is not limited to, an analog filter and an amplifier circuit as are known in the art. Based upon the disclosure provided herein, one of ordinary skill in the art will recognize a variety of circuitry that may be included as part of analog front end circuit 304. In some embodiments, analog input signal 302 is derived from a read/write head assembly (not shown) that is disposed in relation to a magnetic storage medium (not shown).

Analog to digital converter circuit 308 converts processed analog signal 306 into a corresponding series of digital samples 310. Digital samples 310 (and signals derived therefrom) prior to being processed by an equalizer circuit 312 are considered X samples. Analog to digital converter circuit 308 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 310 are provided to an equalizer circuit 312. Equalizer circuit 312 applies an equalization algorithm to digital samples 310 to yield an equalized output 314. In some embodiments of the present invention, equalizer circuit 312 is a digital finite impulse response filter circuit as are known in the art. Equalized output 314 (and signals derived therefrom) after being processed by equalizer circuit 312 contains digital samples which are considered Y samples.

Equalized output 314 is provided to a front end noise predictive filter circuit 320 to perform noise predictive filtering, yielding loop Y samples 322. The noise predictive filter circuit 320 may be, but is not limited to, a noise predictive finite impulse response filter bank, a bank of parallel digital finite impulse response filters applying different filter coefficients or tap coefficients. Any noise predictive filter known in the art may be used.

An adaptation circuit 330 generates filter coefficients 332 for the frontend noise predictive filter circuit 320 based on the equalized output 314, which includes inter-track interference, and on the loop Y samples 322. In some embodiments, the adaptation circuit 330 is a least mean squares error calculation circuit operable to generate filter coefficients that reduce an error signal based on the equalized output 314 and on the loop Y samples 322. Based upon the disclosure provided herein, one of ordinary skill in the art will recognize a variety of error signal generation circuits that may be included as part of adaptation circuit 330 to generate filter coefficients 332. In this embodiment, filter coefficients 332 for the loop noise predictive filter circuit 320 supplying the loop detector circuit 324 are adapted based on equalized output 314 in which inter-track interference has not been cancelled, matching the noise predictive filter adaptation to the data samples processed by loop detector circuit 324. This provides better center track decisions and loss of lock ratio.

The loop Y samples 322 from noise predictive filter circuit 320 are provided to a loop detector circuit 324. The loop detector circuit 324 is a circuit that is capable of producing a detected output 326 by applying a data detection algorithm to the loop Y samples 322 to return a representation of the data from which analog signal 302 was derived. The data detection algorithm applied by the loop detector circuit 324 may be, but is not limited to, a soft output Viterbi algorithm (SOVA), or a maximum a posteriori detection algorithm as are known in the art. Based upon the disclosure provided herein, one of ordinary skill in the art will recognize a variety of data detection algorithms that may be used in relation to different embodiments of the present invention. In some embodiments, loop detector circuit 324 is operable to determine timing feedback and other operations designed to align the sampling of analog to digital converter circuit 308 with the received data set, and/or to adjust a gain applied by analog front end circuit 304.

An inter-track interference cancellation circuit 316 calculates inter-track interference in the equalized output 314 and subtracts the calculated inter-track interference from the equalized output 314 to yield cleaned data samples 318, based on the detected output 326 from loop detector circuit 324 and on side-track NRZ data 317. Again, inter-track interference cancellation is not applied in some embodiments before loop detector circuit 324, enabling the latency of detected output 326 to be kept at a low level for feedback to the analog front end circuit 304 and analog to digital converter circuit 308.

Cleaned data samples 318 are then written to sample buffer circuit 342 where it can then be provided as buffered data 344 for subsequent iterations through backend data detector circuit 346 and data decoder circuit 354. Sample buffer circuit 342 includes sufficient memory to maintain one or more codewords until processing of that codeword is completed through data detector circuit 346 and data decoder circuit 354 including, where warranted, multiple "global iterations" defined as passes through both data detector circuit 346 and data decoder circuit 354 and/or "local iterations" defined as passes through data decoding circuit 354 during a given global iteration.

Cleaned data samples 318 are also provided in some embodiments directly to a backend noise predictive filter circuit 334 to perform noise predictive filtering, yielding Y samples 336. The noise predictive filter circuit 334 may be, but is not limited to, a noise predictive finite impulse response filter bank, a bank of parallel digital finite impulse response filters applying different filter coefficients or tap coefficients. Any noise predictive filter known in the art may be used. The noise predictive filtering in noise predictive filter circuit 334 may be performed either on cleaned data samples 318 direct from inter-track interference cancellation circuit 316 or on buffered data 344 from sample buffer circuit 342.

An adaptation circuit 338 generates filter coefficients 340 for the backend noise predictive filter circuit 334 based on the cleaned data samples 318 (or buffered data 344) and on the Y samples 336. In some embodiments, the adaptation circuit 338 is a least mean squares error calculation circuit operable to generate filter coefficients that reduce an error signal based on the cleaned data samples 318 (or buffered data 344) and on the Y samples 336. Based upon the disclosure provided herein, one of ordinary skill in the art will recognize a variety of error signal generation circuits that may be included as part of adaptation circuit 338 to generate filter coefficients 340. In this embodiment, filter coefficients 340 for the backend noise predictive filter 334 supplying the data detector circuit 346 are adapted based on data samples 318 or 344 in which inter-track interference has been cancelled, thereby tailoring the adaptation for backend noise predictive filter circuit 334 to the inter-track interference cancelled samples in cleaned data samples 318, while the adaptation for the loop noise predictive filter circuit 320 supplying the loop detector circuit 324 is adapted based on equalized output 314 in which inter-track interference has not been cancelled, matching both noise predictive filters 320 and 334 to their input data 314 and 318.

The Y samples 336 from noise predictive filter circuit 334 are provided to data detector circuit 346 which yields detected output 348. Data detector circuit 346 is a data detector circuit capable of producing detected output 348 by applying a data detection algorithm. In some embodiments, the data detection algorithm may be but is not limited to, a soft output Viterbi algorithm (SOVA), or a maximum a posteriori detection algorithm as are known in the art. Based upon the disclosure provided herein, one of ordinary skill in the art will recognize a variety of data detection algorithms that may be used in relation to different embodiments of the present invention. Loop detector circuit 324 and data detector circuit 346 may provide both hard decisions and soft decisions.

Detected output 348 is provided to a central queue memory circuit 350 that operates to buffer data passed between data detector circuit 348 and data decoder circuit 354. When data decoder circuit 354 is available, data decoder circuit 354 receives detected output 348 from central queue memory 350 as a decoder input 352. Data decoder circuit 354 applies a data decoding algorithm to decoder input 352 in an attempt to recover originally written data. The result of the data decoding algorithm is provided as a decoded output 358. Similar to detected output 348, decoded output 358 may include both hard decisions and soft decisions. Data decoder circuit 354 may be any data decoder circuit known in the art that is capable of applying a decoding algorithm to a received input. Data decoder circuit 354 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 354 provides the result of the data decoding algorithm as a data output 362. Data output 362 is provided to a hard decision output circuit 364 where the data is reordered before providing a series of ordered data sets as a data output 366.

One or more iterations through the combination of data detector circuit 346 and data decoder circuit 354 may be made in an effort to converge on the originally written data set. As mentioned above, processing through both the data detector circuit and the data decoder circuit is referred to as a "global iteration". For the first global iteration, data detector circuit 346 applies the data detection algorithm without guidance from a decoded output. For subsequent global iterations, data detector circuit 346 applies the data detection algorithm to Y samples 336 as guided by decoded output 358. Decoded output 358 is received from central queue memory 350 as a detector input 360.

During each global iteration it is possible for data decoder circuit 354 to make one or more local iterations including application of the data decoding algorithm to decoder input 352. For the first local iteration, data decoder circuit 354 applies the data decoder algorithm without guidance from a decoded output 356. For subsequent local iterations, data decoder circuit 354 applies the data decoding algorithm to decoder input 352 as guided by a previous decoded output 356. In some embodiments of the present invention, a default of ten local iterations is allowed for each global iteration.

In the embodiment of FIG. 2, one set of noise predictive filter coefficients 233 and 240 are used for both loop and backend filters 220 and 234, adapted based on cleaned data samples 218 in which inter-track interference has been cancelled. In the embodiment of FIG. 3, two different sets of noise predictive filter coefficients 332 and 340 are used for the loop and backend filters 320 and 334, adapting noise predictive filter coefficients 332 with equalized output 314 containing inter-track interference and adapting noise predictive filter coefficients 340 with cleaned data samples 318 in which inter-track interference has been cancelled. This adaptation is performed in some embodiments on the fly, with the filter coefficients 233, 240, 332 and 340 being adapted over multiple data sectors.

In some other embodiments, when data fails to converge in data decoder circuit 254 or data decoder circuit 254, the noise predictive filter coefficient adaptation may be performed in retry mode. When the data processing system 200 of FIG. 2 operates in retry mode, the cleaned data samples 218 (or inter-track interference cancelled Y samples) may be used to re-adapt the filter coefficients 240 for noise predictive filter circuit 234. To make inter-track interference cancellation work during training, Y-sample based inter-track interference cancellation algorithm can be used to avoid the usage of center track NRZ data. In some of these embodiments of data processing system 200, the re-adaptation of filter coefficients 240 for noise predictive filter circuit 234 is performed using re-equalized X-samples 210.

When the data processing system data processing system 300 of FIG. 3 operates in retry mode, the equalized output 314 with inter-track interference may be used to re-adapt the filter coefficients 332 for the loop noise predictive filter 320 and the cleaned data samples 318 with cancelled inter-track interference may be used to re-adapt the filter coefficients 340 for backend noise predictive filter circuit 334. Alternatively, re-adaptation may be performed only for filter coefficients 340 for backend noise predictive filter circuit 334, obtaining center track decisions either after backend data detector circuit 346 or after a certain number of global and local iterations in data decoder circuit 254, after which the filter coefficients 340 for backend noise predictive filter circuit 334 are readapted using buffered data 344 and either detected output 348 or decoded output 358 in place of Y samples 336. If the loop detector circuit 324 is not running during retry, the backend noise predictive filter circuit 334 can first be re-adapted using equalized output 314 with inter-track interference, and after the center track NRZ data has been obtained, the backend noise predictive filter circuit 334 can be re-adapted again using the cleaned data samples 318 with cancelled inter-track interference. In some embodiments, the re-adaptation is based on the currently processed sector, in contrast to the original adaptation that may be based on a number of sectors, such as but not limited to the last several hundred sectors to be processed.

Figure 4:
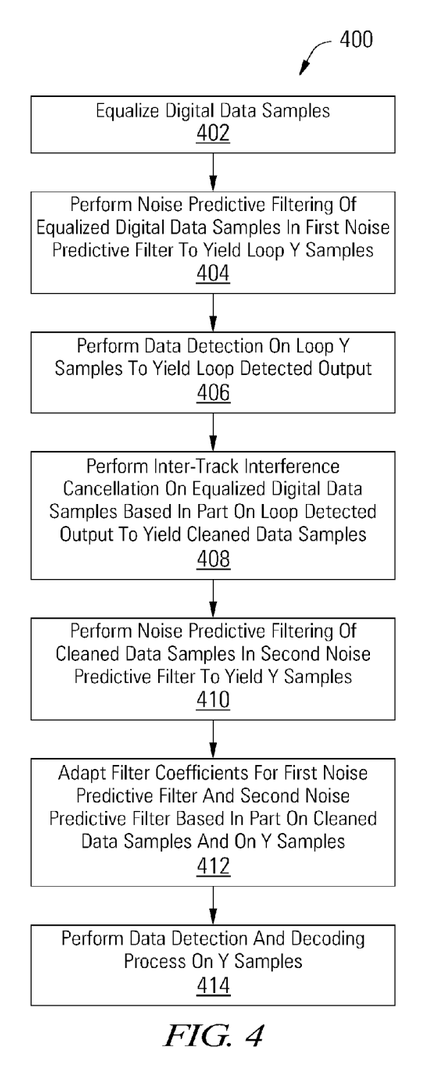
FIG. 4 is a flow diagram showing a method for noise predictive filter adaptation using data samples with inter-track interference cancellation in accordance with some embodiments of the present invention.

Turning to FIG. 4, a flow diagram 400 discloses a method for noise predictive filter adaptation using data samples with inter-track interference cancellation in accordance with some embodiments of the present invention. Following flow diagram 400, digital data samples are equalized (block 402). Noise predictive filtering of equalized digital data samples is performed in a first noise predictive filter to yield loop Y samples (block 404). Data detection is performed on loop Y samples to yield loop detected output (block 406). Inter-track interference cancellation is performed on equalized digital data samples based in part on loop detected output to yield cleaned data samples (block 408). Noise predictive filtering of cleaned data samples is performed in a second noise predictive filter to yield Y samples (block 410). Filter coefficients for the first noise predictive filter and the second noise predictive filter are adapted based in part on cleaned data samples and on Y samples (block 412). Notably, one or more operations of the method may be performed in parallel, such as but not limited to the noise predictive filtering (blocks 404, 410) and the filter coefficient adaptation (block 412). Data detection and decoding processes are performed on the Y samples (block 414). Thus, one set of noise predictive filter coefficients are used for both loop and backend filters, adapted based on cleaned data samples in which inter-track interference has been cancelled.

Figure 5:
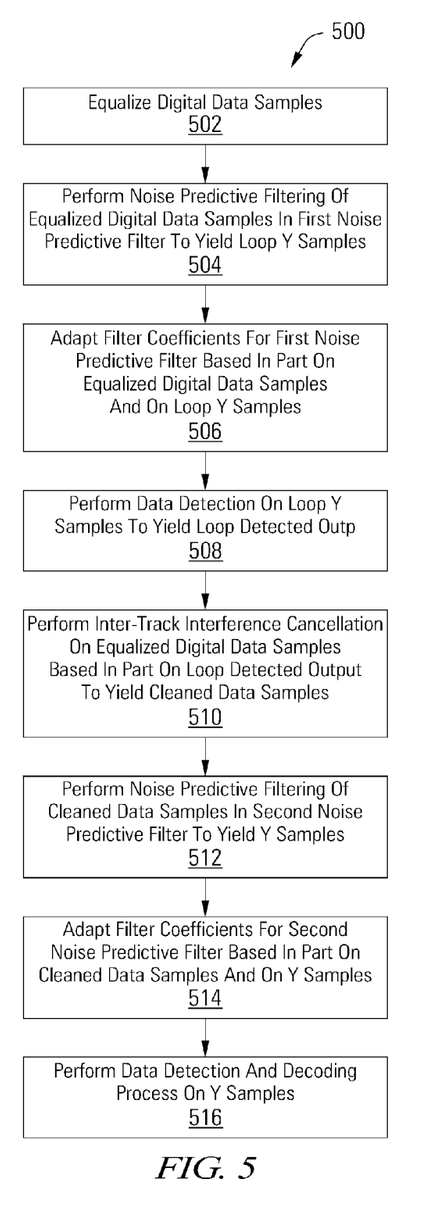
FIG. 5 is a flow diagram showing a method for noise predictive filter adaptation using data samples both with and without inter-track interference cancellation in accordance with some embodiments of the present invention.

Turning to FIG. 5, a flow diagram 500 discloses a method for noise predictive filter adaptation using data samples both with and without inter-track interference cancellation in accordance with some embodiments of the present invention. Following flow diagram 500, digital data samples are equalized (block 502). Noise predictive filtering of equalized digital data samples is performed in a first noise predictive filter to yield loop Y samples (block 504). Filter coefficients for the first noise predictive filter are adapted based in part on equalized digital data samples and on loop Y samples (block 506). Notably, one or more operations of the method may be performed in parallel, such as but not limited to the noise predictive filtering (block 504) and the filter coefficient adaptation (block 506). Data detection is performed on loop Y samples to yield loop detected output (block 508). Inter-track interference cancellation is performed on equalized digital data samples based in part on loop detected output to yield cleaned data samples (block 510). Noise predictive filtering of cleaned data samples is performed in a second noise predictive filter to yield Y samples (block 512). Filter coefficients for the second noise predictive filter are adapted based in part on cleaned data samples and on Y samples (block 514). Data detection and decoding processes are performed on Y samples (block 516). Thus, two different sets of noise predictive filter coefficients are used for the loop and backend filters, adapting loop noise predictive filter coefficients with data samples containing inter-track interference and adapting backend noise predictive filter coefficients with data samples in which inter-track interference has been cancelled.

Figure 6:
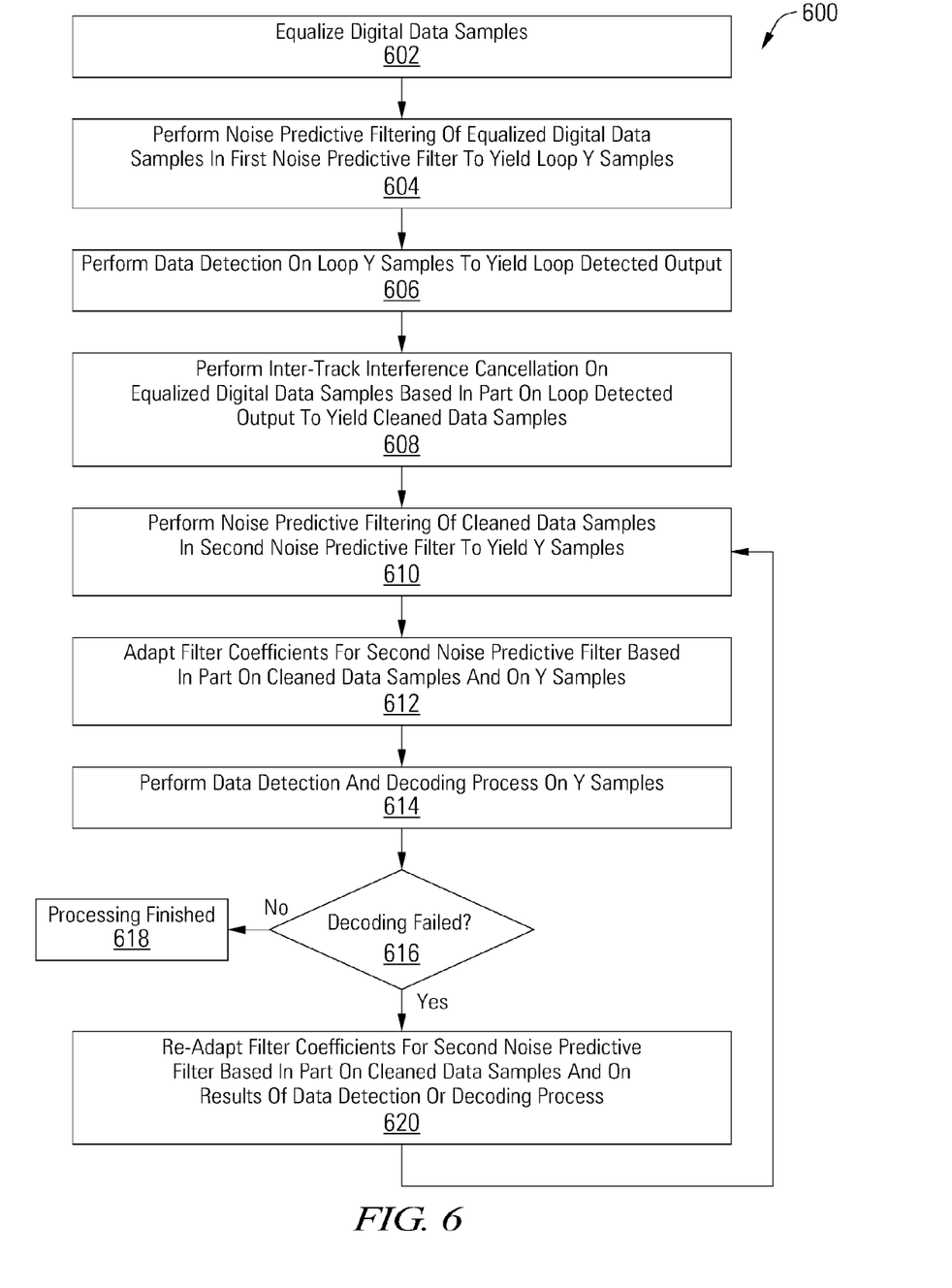
FIG. 6 is a flow diagram showing a method for noise predictive filter re-adaptation using data samples with inter-track interference cancellation in accordance with some embodiments of the present invention.

Turning to FIG. 6, a flow diagram 600 discloses a method for noise predictive filter re-adaptation using data samples with inter-track interference cancellation in accordance with some embodiments of the present invention. Following flow diagram 600, digital data samples are equalized (block 602). Noise predictive filtering of equalized digital data samples is performed in a first noise predictive filter to yield loop Y samples (block 604). Data detection is performed on loop Y samples to yield a loop detected output (block 606). Inter-track interference cancellation is performed on equalized digital data samples based in part on loop detected output to yield cleaned data samples (block 608). Noise predictive filtering of cleaned data samples is performed in a second noise predictive filter to yield Y samples (block 610). Filter coefficients for the second noise predictive filter are adapted based in part on cleaned data samples and on Y samples (block 612). Notably, one or more operations of the method may be performed in parallel, such as but not limited to the noise predictive filtering (block 610) and the filter coefficient adaptation (block 612). Data detection and decoding processes are performed on the Y samples (block 614). A determination is made as to whether decoding failed (block 616). If not, processing is finished (block 618). If so, filter coefficients for the second noise predictive filter are re-adapted based in part on cleaned data samples and on results of the data detection or the decoding process (block 620).

Figure 7:
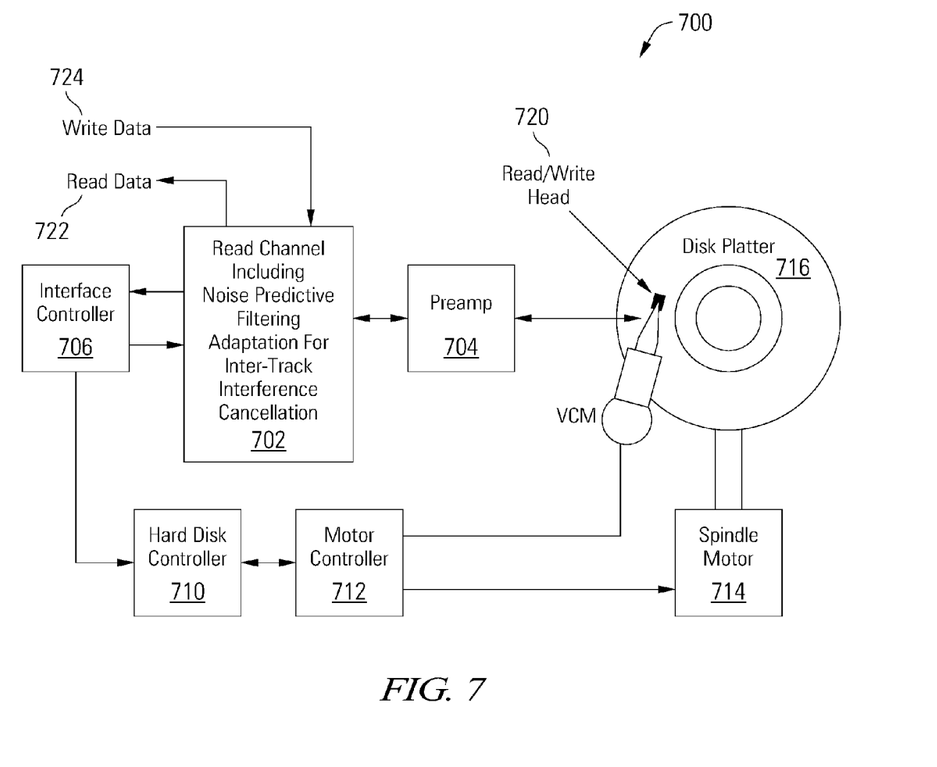
FIG. 7 depicts a storage system including a read channel with noise predictive filtering adaptation for inter-track interference cancellation in accordance with various embodiments of the present invention.

Turning to FIG. 7, a storage system 700 is illustrated as an example application of a data processing system with noise predictive filter adaptation for inter-track interference cancellation in accordance with some embodiments of the present invention. The storage system 700 includes a read channel circuit 702 with a data processing system with noise predictive filter adaptation for inter-track interference cancellation in accordance with some embodiments of the present invention. Storage system 700 may be, for example, a hard disk drive. Storage system 700 also includes a preamplifier 704, an interface controller 706, a hard disk controller 710, a motor controller 712, a spindle motor 714, a disk platter 716, and a read/write head assembly 720. Interface controller 706 controls addressing and timing of data to/from disk platter 716. The data on disk platter 716 consists of groups of magnetic signals that may be detected by read/write head assembly 720 when the assembly is properly positioned over disk platter 716. In one embodiment, disk platter 716 includes magnetic signals recorded in accordance with either a longitudinal or a perpendicular recording scheme.

In a typical read operation, read/write head assembly 720 is accurately positioned by motor controller 712 over a desired data track on disk platter 716. Motor controller 712 both positions read/write head assembly 720 in relation to disk platter 716 and drives spindle motor 714 by moving read/write head assembly 720 to the proper data track on disk platter 716 under the direction of hard disk controller 710. Spindle motor 714 spins disk platter 716 at a determined spin rate (RPMs). Once read/write head assembly 720 is positioned adjacent the proper data track, magnetic signals representing data on disk platter 716 are sensed by read/write head assembly 720 as disk platter 716 is rotated by spindle motor 714. The sensed magnetic signals are provided as a continuous, minute analog signal representative of the magnetic data on disk platter 716. This minute analog signal is transferred from read/write head assembly 720 to read channel circuit 702 via preamplifier 704. Preamplifier 704 is operable to amplify the minute analog signals accessed from disk platter 716. In turn, read channel circuit 702 decodes and digitizes the received analog signal to recreate the information originally written to disk platter 716. This data is provided as read data 722 to a receiving circuit. While processing the read data, read channel circuit 702 processes the received signal using a data processing system with noise predictive filter adaptation for inter-track interference cancellation. Such a data processing system with noise predictive filter adaptation for inter-track interference cancellation may be implemented consistent with that disclosed above in relation to FIGS. 2-3. In some cases, the data processing may be performed consistent with the flow diagrams disclosed above in relation to FIGS. 4-6. A write operation is substantially the opposite of the preceding read operation with write data 724 being provided to read channel circuit 702. This data is then encoded and written to disk platter 716.

It should be noted that storage system 700 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 700, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data processing system used in relation to noise predictive filter adaptation for inter-track interference cancellation is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 700 may be modified to include solid state memory that is used to store data in addition to the storage offered by disk platter 716. This solid state memory may be used in parallel to disk platter 716 to provide additional storage. In such a case, the solid state memory receives and provides information directly to read channel circuit 702. Alternatively, the solid state memory may be used as a cache where it offers faster access time than that offered by disk platter 716. In such a case, the solid state memory may be disposed between interface controller 706 and read channel circuit 702 where it operates as a pass through to disk platter 716 when requested data is not available in the solid state memory or when the solid state memory does not have sufficient storage to hold a newly written data set. Based upon the disclosure provided herein, one of ordinary skill in the art will recognize a variety of storage systems including both disk platter 716 and a solid state memory.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems, devices, methods and arrangements for data processing with noise predictive filter adaptation for inter-track interference cancellation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system comprising:
   a first noise predictive filter circuit operable to filter digital data;
   a data detector circuit operable to apply a data detection algorithm to an output of the first noise predictive filter circuit to yield a detected output;
   an inter-track interference cancellation circuit operable to reduce inter-track interference in the digital data based in part on the first detected output to yield cleaned data;
   a second noise predictive filter circuit operable to filter the cleaned data; and
   an adaptation circuit operable to generate filter coefficients for the second noise predictive filter circuit based in part on the cleaned data and on a signal derived from an output of the second noise predictive filter circuit.

2. The data processing system of claim 1, wherein the adaptation circuit is further operable to configure the first noise predictive filter circuit with the filter coefficients generated based in part on the cleaned data and on the signal derived from the output of the second noise predictive filter circuit.

3. The data processing system of claim 2, wherein the adaptation circuit is operable to generate the filter coefficients based on a plurality of data sectors.

4. The data processing system of claim 2, wherein the adaptation circuit is further operable to re-adapt the filter coefficients based on a currently processed data sector when a data decoding process fails on a second signal derived from the output of the second noise predictive filter circuit.

5. The data processing system of claim 1, further comprising a second adaptation circuit operable to generate second filter coefficients for the first noise predictive filter circuit based in part on the digital data and on a signal derived from an output of the first noise predictive filter circuit.

6. The data processing system of claim 5, wherein the second adaptation circuit is operable to generate the second filter coefficients based on a plurality of data sectors.

7. The data processing system of claim 5, wherein the adaptation circuit is further operable to re-adapt the second filter coefficients based on a currently processed data sector when a data decoding process fails on a second signal derived from the output of the second noise predictive filter circuit.

8. The data processing system of claim 5, wherein inter-track interference has not been cancelled in the digital data used to generate the second filter coefficients in the second adaptation circuit.

9. The data processing system of claim 1, further comprising an analog to digital converter circuit operable to convert an input signal into a series of corresponding digital samples, and an equalizer circuit operable to equalize the series of corresponding digital samples to yield the digital data.

10. The data processing system of claim 1, further comprising a second data detector circuit operable to apply a second data detection algorithm to the output of the second noise predictive filter circuit to yield a second detected output, and a data decoder circuit operable to apply a data decoding algorithm to a decoder input derived from the second detected output to yield a data output.

11. The data processing system of claim 1, wherein the data detection algorithm applied by the data detector circuit comprises a soft output Viterbi algorithm.

12. The data processing system of claim 1, wherein the inter-track interference cancellation circuit is operable to reduce the inter-track interference in the digital data based in part on side-track non-return to zero data.

13. The data processing system of claim 1, wherein the system is implemented as an integrated circuit.

14. The data processing system of claim 1, wherein the data processing system is implemented as part of a data storage device.

15. A method for data processing, comprising:
performing loop processing of a digital signal, comprising noise predictive filtering of the digital signal to yield a filtered digital signal and detection of data values in the filtered digital signal to yield detected values;
cancelling inter-track interference in the digital signal based on the detected values and on side track data to yield cleaned data, wherein inter-track interference comprises interference between a current magnetic storage track and a neighboring magnetic side track;
performing backend processing of the cleaned data, comprising noise predictive filtering of the cleaned data to yield a second filtered digital signal, and detection and decoding of the second filtered digital signal; and
adapting filter coefficients used in the noise predictive filtering of the cleaned data based on the cleaned data.

16. The method of claim 15, wherein the filter coefficients used in the noise predictive filtering of the digital signal are adapted based on the cleaned data.

17. The method of claim 15, wherein the filter coefficients used in the noise predictive filtering of the digital signal are adapted based on the digital signal without inter-track interference cancellation.

18. The method of claim 15, wherein the filter coefficients are adapted based on a plurality of data sectors.

19. The method of claim 15, further comprising re-adapting the filter coefficients based on a current data sector when the backend processing fails.

20. A storage device, comprising:
a storage medium;
a head assembly disposed in relation to the storage medium and operable to provide a sensed signal corresponding to a data set on the storage medium; and
a read channel circuit comprising:
a loop processing circuit comprising a first noise predictive filter operable to filter digital data derived from the sensed signal, a loop detector circuit connected to the loop processing circuit, and an inter-track interference cancellation circuit connected to the loop detector circuit; and
a backend processing circuit comprising a second noise predictive filter and an adaptation circuit operable to generate filter coefficients for the second noise predictive filter circuit based in part on cleaned data from the inter-track interference cancellation circuit and on a signal derived from an output of the second noise predictive filter circuit.

* * * * *